July 18, 1939.  T. P. FLYNN ET AL  2,166,105
COMBINED GEAR POWERED BULLDOZER AND HOIST
Filed Sept. 13, 1937  4 Sheets-Sheet 1

INVENTORS
THEODORE P. FLYNN,
RAYMOND E. NEILS.
By
M. G. White, C. W. Boyle, P. D. Cronin,
H. H. Fass, F. G. Manheim, and
A. J. Kramer
ATTORNEYS July 18, 1939. T. P. FLYNN ET AL 2,166,105
COMBINED GEAR POWERED BULLDOZER AND HOIST
Filed Sept. 13, 1937 4 Sheets-Sheet 3

INVENTORS
THEODORE P. FLYNN.
RAYMOND E. NEILS.
BY ATTORNEYS.

July 18, 1939.　　T. P. FLYNN ET AL　　2,166,105
COMBINED GEAR POWERED BULLDOZER AND HOIST
Filed Sept. 13, 1937　　4 Sheets-Sheet 4

INVENTORS.
THEODORE P. FLYNN.
RAYMOND E. NEILS.
BY ATTORNEYS.

Patented July 18, 1939

UNITED STATES PATENT OFFICE

2,166,105

COMBINED GEAR POWERED BULLDOZER AND HOIST

Theodore P. Flynn and Raymond E. Neils, Portland, Oreg.; dedicated to the free use of the People of the United States of America Application September 13, 1937, Serial No. 163,642

4 Claims. (Cl. 37—144)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to us of any royalty thereon.

We hereby dedicate the invention herein described to the free use of the People of the United States of America to take effect on the granting of a patent to us.

This invention relates to a grading and hoisting device attached to a conventional tractor and has for an important object, a combination hoist and bulldozer machine, where the hoist is built in and combined with the bulldozer power mechanism.

Another object of this invention is to provide, with the combination of a hoist and bulldozer mounted on the same tractor, an arrangement whereby a conventional tractor can be made a purposeful machine.

Other objects are to provide an arrangement of geared power, clutching and braking mechanism to furnish power up and down, to hold with a brake and also permit full floating and all other necessary movements and positions for a bulldozer blade; also, to furnish motion, power and braking to a hoisting drum unit at the rear of the tractor.

Still another object is to provide a drum hoisting unit of one or two drums with no braking or clutching apparatus built in or attached directly to the hoisting drum or drums. The advantages gained by elimination of a braking and clutching apparatus directly attached to the hoisting drums are, that greater cable space is provided and the heat usually generated from brake bands and clutches as used on conventional hoist drums is completely eliminated, and the total weight of the drum hoisting unit is reduced. This is a distinct advantage in the operation and use of the tractor, because the elimination of weight on a drum hoisting apparatus, which is usually mounted on and projects from the rear of the tractor, permits better balance and reduces the rear terminal heaviness found on the conventional type of hoisting units now in use.

And still another object is, that by combining a hoist and bulldozer power apparatus, a considerable reduction in total weight is accomplished as against any of the present conventional hoist and bulldozer arrangement where the hoist and bulldozer and their power transmitting apparatus is not related and is constructed separately, mounted independently, and driven with separate power transmitting apparatus.

A further object is to provide in a unit combination, a gear and clutch power transmitting arrangement, that will provide reversible direction power for a bulldozer unit, and by shifting one gear, the same power transmitting arrangement provides the necessary power and motion for a single or double drum hoisting unit at the rear of the tractor.

A still further object is to provide, through an automatically operated holding brake, a feature whereby the back lash and shock from the bulldozer blade is not delivered to any of the power transmitting mechanism. All back lash and shocks that are not absorbed by the shock springs attached to the bulldozer frame is arrested immediately and absorbed in the automatic holding brake. This feature gives longer life to the power transmitting apparatus, and insures it against wear and breakage from shock. This automatic holding brake also provides a positive holding device which is automatically and instantaneously applied when the bulldozer blade is stopped in any position, and when applied, this brake gives instant relief to the power transmitting apparatus which elevates or lowers the blade.

Still further objects are to provide a complete power transmitting, clutching, and braking combination built into one unit that provides the following operating features: Reversible power, holding and floating for a bulldozer blade; power, motion, and a holding brake for the drum hoisting apparatus at the rear, and since the braking for the hoist at the rear is applied from the bulldozer clutching and power transmitting units on this invention, through geared connections to said drum at the rear, the braking leverage on the drum hoist is greatly increased through this geared connection which permits the use of a much smaller and more economical braking unit for the rear hoist, drums, and braking applied to the rear hoists requires much less effort on the part of the operator and results in much less strain and wear on the braking apparatus throughout than is the case of the direct braking principle now in general use on heavy duty hoists.

Another and further object is to provide the arrangement and combination of a geared type bulldozer hoist power transmitting unit that is positive and instantaneous in its engagement and operation, that will be an improvement on the present conventional types of bulldozer lifting apparatus.

The above brief description of the power transmitting apparatus on most of the conventional types of bulldozers now in use is given to point out their chief weakness, to show the necessity for improvements, and to demonstrate the value and need for this invention.

And another and further object is to provide a one lever control for the operator, which lever connected to and through an arrangement of automatically operated linkage, engages and puts into motion the following power and braking applications: Power for operating the bulldozer blade up and down, power to the hoist at the rear, brake engagement and release to the hoist at the rear, and brake engagement and release for the main braking device of the bulldozer blade. All these movements and applications of power and braking are obtained by three distinct positions of one control lever, namely, forward, backward, and neutral.

Still another and further object is to provide a tilting device for the ends of the bulldozer blade, which device can be operated from the driver's position. The feature of this device as used on this gear powered bulldozer is, that all blade and tilting operations are performed with power for operating the bulldozer blade both up and down.

The following specification, considered together with the accompanying drawings, will fully disclose this invention, its arrangements, combinations, and operations of parts, and further objects and advantages thereof will be apparent.

Figure 1:
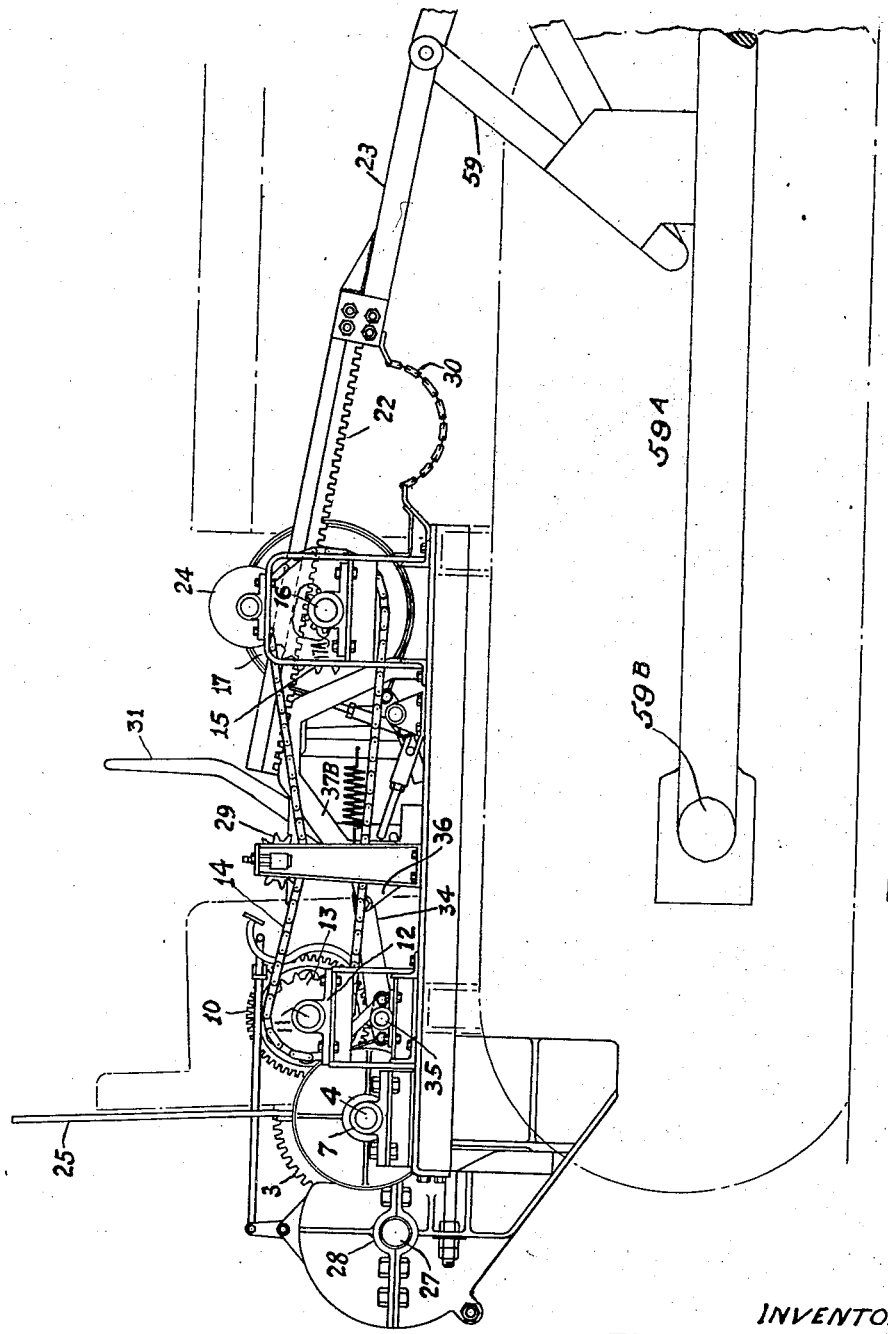
Figure 1 is a side view of the mechanism for elevating and lowering a bulldozer blade and driving a hoisting drum as applied to a tractor.

Referring with more particularity to the drawings in which like numerals designate like parts, the bevel gear 1 is keyed to the power take off shaft of the tractor and transmits the power to the bevel gear 2, which last mentioned gear 2 is keyed to a shaft (not shown) directly below shaft 4. Spur gear 3 is keyed to shaft 4 and receives its power from a spur gear (not shown) directly beneath it on the same shaft to which the beveled gear 2 is keyed thus delivering power to the shaft 4. The said shaft 4 is rotatably mounted in the bearings 7—7—7 and terminates about midway of the lifting sprocket clutch 8. From that terminal point this shaft line is extended to bearing 7A by shaft 8A. Mounted on the main shaft 4 are two planetary units 5 and 6. The planetary unit 5, through the sliding spur gear 9 engages spur gear 10 mounted on shaft 11, said shaft 11 being rotatably mounted in the bearings 12 12. A driver sprocket 13 is keyed to the shaft 11, which sprocket drives the sprocket 15 by means of the chain 14. Said sprocket 15 is keyed to the shaft 16, which shaft is rotatably mounted in the bearings 15A 15A 15A. A brake wheel 17 and a rack pinion 17A are mounted on the shaft 16. For the purpose of eliminating slack in the drive chains 14 and 19, adjustable idlers are provided, such as the idler 29 shown in connection with chain 14. A similar idler may be provided for chain 19. Another driver sprocket 18 is keyed to the shaft 8A between the clutch 8 and the bearing 7A. Said clutch 8 is composed of two interlocking parts, one of which is proximate to the planetary gear unit 6 and rigidly attached thereto, and the other part is keyed to the end of said shaft 8A.

The said sprocket 18 is connected with another driven sprocket 20 by means of the transmission chain 19, above mentioned. This driven sprocket is keyed to the shaft 16A, which shaft is mounted in alignment with shaft 16 in the bearings 20A 20A. The clutch 21, similar to the clutch 8, is composed of two interlocking parts, one of which is keyed to the end of the shaft 16A, while the other interlocking part is keyed to the end of the shaft 16 with an axial sliding fit. This clutch is used in connection with tilting the bulldozer blade, hereinafter more fully explained.

The racks 22 22 are suitably fastened to connecting members 23 23 having a pin connection to the bulldozer blade stirrups 59. The connecting members 23, 23 are also connected to the blade holding pusharms 59A (the connecting means being not shown), and said pusharms 59A being pivoted to the bulldozer at 59B, one on either side of the bulldozer (only one shown). The directions of travel of said racks 22 22 are determined by the guide wheels 24 24, which guide wheels also serve to keep proper contact between said racks and their respective pinions 17A. These rack pinions through movements of the shafts 16 and 16A transmit power for elevating or lowering the bulldozer blade. A chain or other flexible means 30 is provided to limit the travel of said racks so that they will not disengage the pinions 17A. The brake wheel 17 is normally withheld from rotating by a conventional brake band 17B peripherally mounted thereon, this holding position being accomplished by the contraction of said brake band around said brake wheel by the force of the action of the spring 66. This position is automatically maintained when the operating lever 31 is in its neutral position. When said lever 31 is out of its neutral position, the said brake band is made to release its hold on the brake wheel 17 by means of a linkage system connecting said lever with said brake band.

By means of the lever 25, the sliding gear 9 can be disengaged from the gear 10 and engaged with the drum gear 26, which drum gear is keyed to the shaft 27 and which shaft is mounted in the bearings 28 28. In conjunction with this operation, the clutch 8 is thrown out of engagement, permitting operation of the drum separately from the bulldozer blade.

Figure 5:
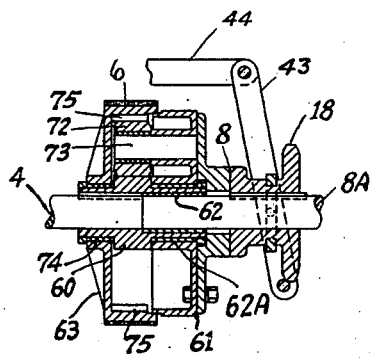
Figure 5 is the vertical sectional view through the planetary unit with a sprocket clutch in position for applying power to elevate the bulldozer blade.
Figure 6:
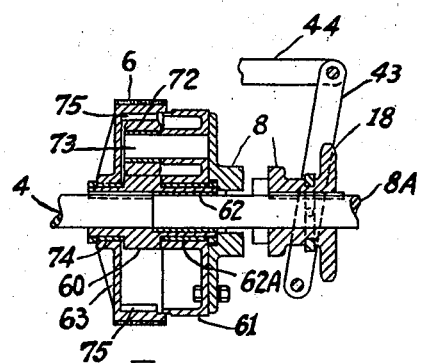
Figure 6 is a vertical sectional view through the planetary unit with the sprocket clutch in disengaged position when power is being applied to the hoist drum.
Figure 8:
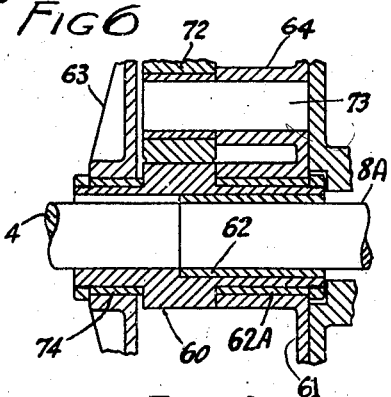
Figure 8 is a vertical part section view of the planetary unit, hereinafter designated by the numeral 6, showing the extended hub of a sun pinion which serves as a bearing for a shaft line extension, hereinafter designated by the numeral 8A.

Referring with more particularity to Figures 5, 6 and 8, the type of construction used for 6 comprises a sun pinion 60 fixed to the end of shaft 4, said shaft abutting the end of shaft 8A in the assembly, substantially as shown. Three idling or planet pinions 72 (only one shown) are disposed in a circle at 120° intervals concentric with the shaft 4 and engaging the sun pinion 60. Said planet pinions 72 are rotatably mounted on three shafts 73 (only one shown), respectively, which shafts are press-fitted into the disc 61 or secured thereto by any other suitable means. The hub of the sun pinion 60 is extended over a bushing 62 on the shaft 8A. Another bushing 62A is mounted on the extended hub of the sun pinion 60 upon which the disc 61 is rotatably mounted. The hub of sun pinion 60 is also extended in the opposite direction to receive a bushing 74 upon which the drum wheel 63 is mounted. Said drum wheel 63 is provided with an internal ring gear 75 in constant mesh with the planet pinions 72. When no braking force is applied to the drum wheel 63, so that it is free to rotate on the bushing 74, the shaft 4, which in operation is constantly rotating, rotates the sun pinion 60 which in turn causes the planet pinions 72 to rotate about their respective shafts 73. These planet pinions, being in constant mesh with the ring gear 75 cause the wheel 63 to rotate. Normal frictional forces prevent the planet pinions from revolving about the sun pinion 60. However, when rotation of the drum wheel 63 is arrested by clamping a brake band around it, the planet pinions must not only rotate on their respective axes but they must also revolve about the sun pinion 60, because they are constrained and the relative movement between them and the disc 63 must be maintained. As the planet pinions revolve they carry with them the disc 61 to which one-half of the clutch 8 is attached.

Figure 3:
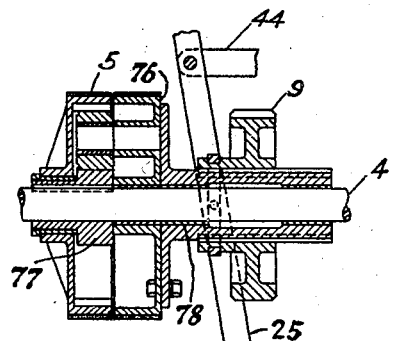
Figure 3 is a vertical sectional view through the planetary unit with the sliding gear in position for applying power downward on the bulldozer blade.
Figure 4:
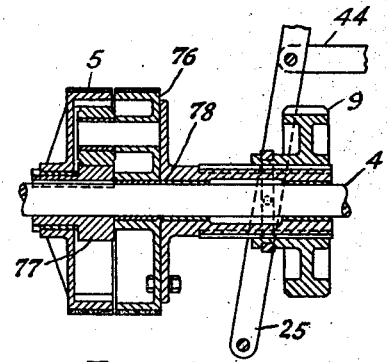
Figure 4 is a vertical sectional view through the planetary unit with the sliding gear in position for applying power to the hoisting drum.

Figures 3 and 4 illustrate the type of planetary gear unit used at 5, which is similar to that used at 6 except that the shaft 4 extends all the way through the assembly, substantially as shown. Also instead of mounting the drum wheel 76 which is similar to the disc 61 in Figures 5, 6, and 8, on an extension of the hub of the sun pinion 77, it is mounted directly on a bushing 78 of the shaft 4.

Figure 14:
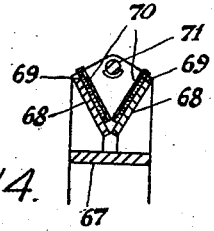
Figure 14 is a sectional view through the rim of a quick cooling brake drum, when using a beveled groove braking surface instead of the conventional flat cylindrical surface.
Figure 12:
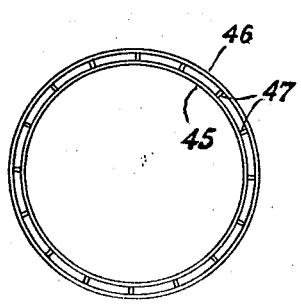
Figure 12 is a side view of a quick-cooling brake drum.

To provide sufficient braking surface where space will not permit the conventional flat cylindrical braking surface, a beveled surface may be employed as shown in Figure 14, consisting of an inner band 67, an outer beveled braking surface 68, brake lining material 69, segmented brake lining material holder 70, and a tension member 71 for applying pressure to the braking surface 68. Figure 12 illustrates a quick cooling planetary unit brake drum, consisting of an inner band 45, an outer band 46 and separating ribs 47. The inside of the band 45 is turned to a shrink fit on the braking disc and internal gear of the planetary unit. A brake band is applied to the outer band 46. With this arrangement it is possible to increase the leverage of the planetary unit, as well as decrease the severe wearing conditions of the braking material. Also, when constant braking application is required easier operation is accomplished. Due to constant application of the brake a certain amount of heat of friction is generated which, in some cases, becomes excessive. To dispose of this excessive heat the ribs 47 are employed to provide a space between the bands 45 and 46. Due to the rotation of these parts an increased amount of air flow is created over a greater cooling surface, thereby cooling the brake band 46 more quickly. Another feature accomplished with a band of this type is the possibility of using two planetary units of the same size and gear ratios and place this band on the planetary unit having the heavier duty to perform, thereby increasing braking leverage.

Figure 13:
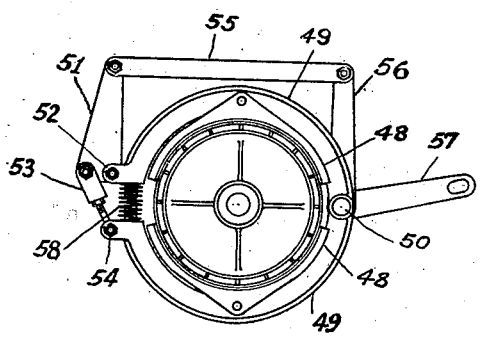
Figure 13 is a side view of a brake shoe application in connection with a quick cooling brake drum shrunk on the brake band surface of a planetary unit.

The Figure 13 illustrates a planetary unit with a quick cooling brake drum of the type above mentioned assembled. This figure also illustrates the braking medium of two shoes 48 48 instead of the tensional band such as the member 71 shown in Figure 14. The said shoes 48 48 are fastened to scissor-type lever arms 49 49 fulcrumed at shaft 50. Pressure is applied by the bell crank 51 which has a floating fulcrum at lug 52 and a lever arm connection with adjustable link 53 anchored at the lug 54. The link 55 connects the bell crank 51 with the lever 56, which lever is keyed to the shaft 50. The lever arm 57 is also keyed to the shaft 50 and has the same function as lever arm 34 in Figure 10. By reversing the positions of the bell crank 51, link 55, and lever 56 to the other side of the drum from that shown in Figure 13, the movement of arm 57 in the opposite direction would function to apply the brake shoes 48 48. Reversing these connections, fulcrum point 52 changes to point 54, and the anchor point of the adjustable connection 53 changes from 54 to 52. Such a reverse movement is necessary when making application to two separate planetary units from a single shaft operation. The spring 58 is compressibly mounted and holds the brake shoes away from the brake drum when released.

Figure 10:
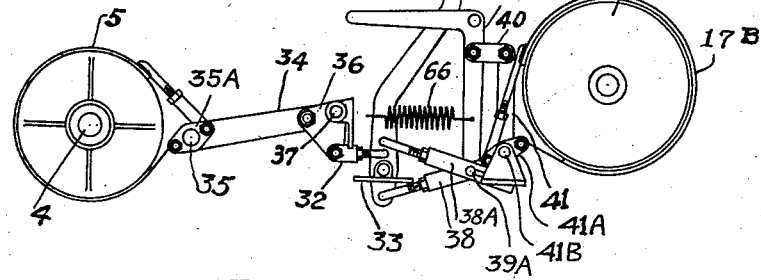
Figure 10 is a side view of the operating mechanism with supporting members removed and showing brake band arrangement for transmitting power for downward motion of bulldozer blade and also to hoisting drum.
Figure 11:
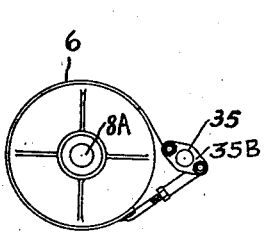
Figure 11 is a side view of the lifting planetary power unit showing the brake band arrangement for applying power for lifting the bulldozer blade.

Referring with more particularity to Figure 10, the operating lever 31 is fulcrumed at the bracket 33, said bracket being secured at a convenient point on the frame of the tractor, such as a fender. The lower corner of the bell crank 36 is attached near the fulcrum of said lever by means of an adjustable connecting rod. The bell crank 36 is fulcrumed at 37, to a bracket 37A of the main supporting bracket 37B. The arm 34 is keyed to shaft 35 and pivotally mounted to the upper corner of the bell crank 36. The flanged member 35A is also keyed to shaft 35. The terminal ends of the brake band of the planetary unit 5 is connected to the member 35A, substantially as shown in Figure 10. Similar braking means are provided for the planetary unit 6 (Figure 11), except that the member 35B is keyed to the shaft 35, substantially perpendicularly to member 35A, and members connecting it to the brake band terminals are interchanged.

The linkage system in reference to the brake 17 is built up of a flanged member 41A keyed to a shaft member 41B, to which are connected the brake band terminals of brake 17 similar to that pertaining to the planetary gear unit 5. One end of each of adjustable connecting links 38 and 38A are pivotally mounted on the lever 31, the link 38 being below the fulcrum, and the link 38A being above the fulcrum. These two links cross each other and are pivotally connected to the bent lever 39 at their intersecting point by means of the pin 39A. The link 38A is further provided with a slotted section effecting a restricted sliding contact with the pin 39A. The other end of the link 38A is free while the other end of the link 38 is pivotally secured to the member 41A, substantially as shown in the drawings. The link 41 is substantially parallel to the vertical arm of the bent lever 39 and has one of its ends keyed to the shaft 41B, while the other end is connected to said lever 39 below its fulcrum by means of the connecting link 40.

The operation of this invention is as follows:

Bevel gear 1 receives power from a power shaft (not shown) of the tractor and through the bevel gear 2, a spur pinion (not shown), and spur gear 3, power is delivered to shaft 4. Sun pinions 60 and 77 of the two planetary units 6 and 5, respectively, being fixed to the shaft 4, continuously rotate whenever the bevel gear 1 is actuated by the power shaft of the tractor. By moving the operating lever 31 toward the driver's seat the arm 34 is raised and clamps the brake band on planetary unit 6 and, at the same time, releases the brake band on the planetary gear unit 5. Since the shaft 4 is constantly turning, the act of clamping the band on the disc of the planetary gear unit 5, which disc constitutes the internal gear of the planetary system, stops its motion. When this disc stops the planetary pinions instead of just rotating around their own axes are also forced to move around the internal gear, thereby rotating the clutch 8. This rotation transmitted to the sprocket 18 is usually in a counter-clockwise direction (when viewed as in Figure 1) and furnishes the power for backward movement of racks 22 22, which in turn elevate the bulldozer blade.

When the operating lever 31 is pushed away from the operator's seat, the arm 34 is moved downward, clamping the brake band on the disc of the internal gear of the planetary unit 5. Consequently, the sliding gear 9 rotates in a counter-clockwise direction, which motion is transmitted to sprocket 13, furnishing power for movement of racks 22 22 for a downward movement of the bulldozer blade.

A movement of operating lever 31 in either direction from its neutral position releases the band pressure on brake wheel 17 so that there is no retarding by this brake wheel of the powered motion directed to elevate or lower the bulldozer blade.

Figure 2:
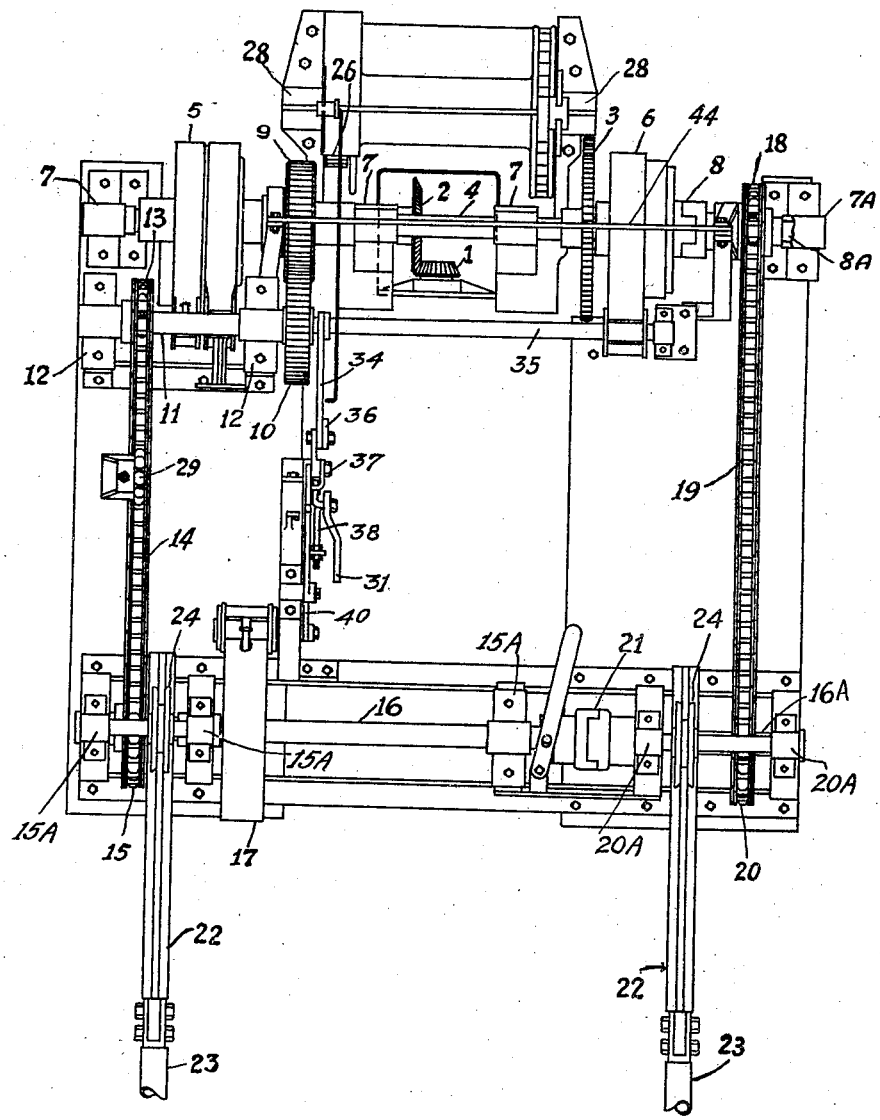
Figure 2 is a plan view of the mechanism for elevating and lowering the bulldozer blade and driving a hoisting drum.
Figure 7:
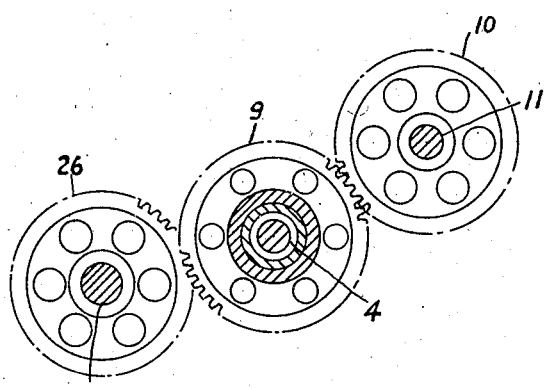
Figure 7 is a side view showing relative positions of the sliding gear and the driven gears.

When the levers 25 and 43 are in the position shown in Figure 3 and Figure 5, respectively, their movements being correspondingly coordinated through the connecting link 44, the planetary unit 6 delivers power for raising the bulldozer blade and the planetary unit 5 delivers power for lowering the bulldozer blade. And, when lever 25 and lever 43 are in the opposite position as shown in Figure 4 and Figure 6, respectively, the clutch 8 is separated so that no motion will be delivered to sprocket 18 and sliding gear 9 is moved to engage the gear 26 (Figure 2 and Figure 7) of the hoisting drum unit.

With this arrangement it is not possible to use the bulldozer blade actuating mechanism at the same time power is being applied to the drum hoisting unit.

Figure 9:
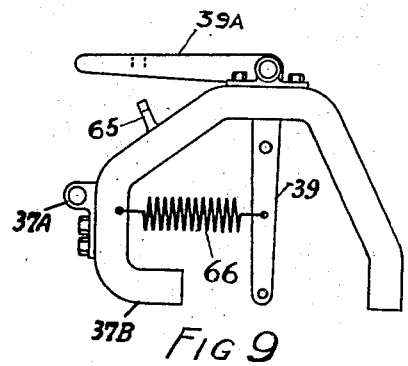
Figure 9 is a side view of the operating mechanism frame support showing floating lever and spring anchor.

To float the bulldozer blade for leveling operation, an extension 39A is provided on lever 39 (Figure 9) and is moved to engage holding lug 65, thus making the brake wheel 17 free to move in either direction as determined by the floating movement of the bulldozer blade.

Having thus described our invention, we claim:

1. In a bulldozer, a mechanism comprising two speed reduction and clutch planetary units disposed on opposite ends of a cross shaft, each of said units carrying an extended sun pinion and sleeve adapted for use as a bearing for said cross shaft and as a bearing for the driving half of the planetary unit.

2. In a bulldozer, mechanism for actuating blade carrying pusharms, a power transmitting mechanism consisting of a divided cross shaft, a clutch disengagedly connecting both segments of said cross shaft, two driven sprockets and two rack pinions keyed to said shaft, two racks co-operatively engaged with said rack pinions, respectively, and a brake unit mounted on said cross shaft, all being cooperatively adapted to independently transmit power to said pusharms and to hold said pusharms from movements relative to said bulldozer.

3. In a tractor, the combination of blade holding stirrups, lever arms secured to said stirrups, racks secured to said lever arms, rack pinions keyed to a bisegmented cross shaft and cooperatively engaged with said racks, sprockets keyed to said cross shaft adapted to receive power from the power plant of said tractor, a brake unit mounted on said cross shaft, and a clutch disengagedly connecting the segments of said cross shaft, all substantially as set forth.

4. In a tractor, the combination of parts consisting of, two adjacent speed reduction, clutch, and power transmission planetary units mounted on a cross shaft, adapted to receive power from the power plant of said tractor, one of said planetary units being adapted by means of a slidable gear to transmit power and motion in one position to a hoisting drum disposed in the rear of said tractor and in another position to a cross shaft adjacent to said planetary units, a sprocket keyed to said adjacent cross shaft, another cross shaft being substantially an extension of said first-mentioned cross shaft, a clutch adapted to couple said cross shaft with said extended cross shaft, a bisegmented pinion cross shaft parallel to said first-mentioned cross shaft, sprockets keyed to said pinion cross shaft adapted to receive power by flexible chain means from said adjacent shaft sprocket and said extended shaft sprocket, rack pinions carried by said pinion cross shaft, a clutch adapted for engaging and disengaging the segments of said pinion cross shaft, braking means keyed to said pinion cross shaft and normally holding said cross shaft from rotation, racks engaging said rack pinions, means for mounting a bulldozer blade on said tractor, means pivotally connecting said racks to said bulldozer blade mounting means, and a single lever in connection with a linkage system for controlling the movements of all of said parts.

THEODORE P. FLYNN.
RAYMOND E. NEILS.